United States Patent
Williams et al.

[11] Patent Number: 6,131,963
[45] Date of Patent: *Oct. 17, 2000

[54] FERRULE WITH RELIEF TO REDUCE GALLING

[75] Inventors: Peter C. Williams, Cleveland Heights; Howard C. B. Kuhns, Aurora, both of Ohio

[73] Assignee: Swagelok Company, Solon, Ohio

[ * ] Notice: This patent is subject to a terminal disclaimer.

[21] Appl. No.: 09/054,186

[22] Filed: Apr. 2, 1998

Related U.S. Application Data

[63] Continuation-in-part of application No. 08/834,255, Apr. 15, 1997, Pat. No. 5,882,050.

[51] Int. Cl.[7] .................................................. F16L 19/06
[52] U.S. Cl. ........................ 285/343; 285/382.7; 285/348
[58] Field of Search .............................. 285/382.7, 343, 285/348, 342, 341

[56] References Cited

U.S. PATENT DOCUMENTS

| | | | |
|---|---|---|---|
| 388,522 | 8/1888 | Beauchemin . | |
| 1,323,705 | 12/1919 | Lynch . | |
| 2,150,042 | 3/1939 | Shultz | 285/166 |
| 2,179,127 | 11/1939 | Lauer | 285/122 |
| 2,182,811 | 12/1939 | Kocher | 285/123 |
| 2,330,841 | 10/1943 | Parker | 285/86 |
| 2,405,822 | 8/1946 | Franck | 285/90 |
| 2,463,707 | 3/1949 | Matousek | 285/166 |
| 2,641,487 | 6/1953 | LaMarre | 285/122 |
| 2,687,315 | 8/1954 | Courtot | 285/382.7 |
| 2,701,149 | 2/1955 | Kreidel et al. | 285/382.7 |
| 2,738,994 | 3/1956 | Kreidel et al. | 285/382.7 |
| 2,744,651 | 5/1956 | Bredtschneider | 220/46 |
| 2,749,152 | 6/1956 | Courtot | 285/120 |
| 3,103,373 | 9/1963 | Lennon et al. | 285/342 |
| 3,120,969 | 2/1964 | Schmohl | 285/341 |
| 3,215,457 | 11/1965 | Teeters | 285/341 |
| 3,250,550 | 5/1966 | Lyon | 285/3 |
| 3,275,350 | 9/1966 | Kody et al. | 285/341 |
| 3,290,069 | 12/1966 | Davis | 285/341 |
| 3,321,947 | 5/1967 | Teeters | 72/377 |
| 3,336,058 | 8/1967 | Franck | 285/341 |
| 3,433,508 | 3/1969 | Teeters | 285/341 |
| 3,445,128 | 5/1969 | Teeters | 285/382.7 |
| 3,484,123 | 12/1969 | van der Velden | 285/341 |
| 3,695,647 | 10/1972 | Pugliese | 285/341 |
| 3,707,302 | 12/1972 | Hiszpanski | 285/382.7 |
| 3,888,522 | 6/1975 | Moreiras | 285/382.7 |

(List continued on next page.)

FOREIGN PATENT DOCUMENTS

| | | | |
|---|---|---|---|
| 489289 | 4/1992 | European Pat. Off. | 285/382.7 |
| 757204 | 12/1933 | France . | |
| 1092160 | 4/1955 | France | 285/382.7 |
| 4041679 | 6/1992 | Germany | 285/382.7 |
| 6710340 | 1/1968 | Netherlands . | |
| 598530 | 4/1978 | Switzerland | 285/382.7 |
| 836002 | 6/1960 | United Kingdom | 285/382.7 |
| 2032555 | 5/1980 | United Kingdom | 285/382.7 |
| 2080900 | 2/1982 | United Kingdom | 285/282.7 |
| 89/09904 | 10/1989 | WIPO | 285/282.7 |

*Primary Examiner*—Eric K. Nicholson
*Attorney, Agent, or Firm*—Calfee, Halter & Griswold

[57] ABSTRACT

High localized loading, galling, and high torque forces have been generally eliminated or greatly reduced in a two ferrule tube fitting assembly through suitable modification of the rear ferrule so as to redirect the reaction forces acting between the front ferrule and the drive nut. The rear ferrule has a cylindrical interior wall that closely surrounds the tube end and is provided on the interior cylindrical wall with a circumferentially continuous radial recess that is located between the nose and rear wall of the rear ferrule. The rear ferrule also has a radially external wall that is substantially conical and additionally shaped to extend radially outward toward the enlarged diameter portion or flange of the rear ferrule. The rear ferrule further includes a contoured face on the rear driven surface of the ferrule that engages the drive surface of the drive nut.

11 Claims, 15 Drawing Sheets

U.S. PATENT DOCUMENTS

| | | | |
|---|---|---|---|
| 4,076,286 | 2/1978 | Spontelli | 285/341 |
| 4,230,349 | 10/1980 | Normark | 285/342 |
| 4,235,461 | 11/1980 | Normark | 285/340 |
| 4,630,851 | 12/1986 | Ogawa | 285/341 |
| 4,826,218 | 5/1989 | Zahuranec | 285/342 |
| 4,915,427 | 4/1990 | Zahuranec | 285/342 |
| 5,217,261 | 6/1993 | DeWitt et al. | 285/332.2 |
| 5,351,998 | 10/1994 | Behrens et al. | 285/382.7 |
| 5,482,332 | 1/1996 | Ohmi et al. | 285/328 |
| 5,882,050 | 3/1999 | Williams et al. | 285/382.7 |
| 5,934,714 | 8/1999 | Sugiyama et al. | 285/342 |

FERRULE WITH RELIEF TO REDUCE GALLING

CROSS-REFERENCE TO RELATED APPLICATION

This application is a continuation-in-part of U.S. patent application Ser. No. 08/834,255 filed on Apr. 15, 1997, now U.S. Pat. No. 5,882,050 the entire disclosure of which is fully incorporated herein by reference.

BACKGROUND OF THE INVENTION

The subject invention is directed to the art of ferrule type tube fittings. More particularly, the invention concerns a two ferrule fitting wherein the rear ferrule is designed to reduce the torque required to rotate the associated nut and to also reduce galling between the rear ferrule and the interior surface of the drive nut.

A commercially available and highly successful two ferrule fitting used for tubing is illustrated in FIGS. 1 and 1A. FIG. 1 shows the fitting components in a finger tight position preparatory to final tightening, whereas FIG. 1A shows the fitting after final tightening. As shown, the fitting comprises a body 10 having a cylindrical opening 12 counterbored for receiving tube end 13. A tapered, frusto-conical camming mouth 14 is located at the axial outer end of the counterbore. A front ferrule 16 having a smooth, cylindrical inner wall 18 is closely received on the tube. The front ferrule has a frusto-conical outer surface 20 to be received in the camming mouth.

Associated with the front ferrule 16 and located axially outward therefrom is a rear ferrule 22 configured as shown with a tapered nose portion 24 and a rear flange 26 having an inclined end surface 28. The tapered nose enters a tapered camming surface in the rear surface of the front ferrule.

The ferrules 16, 22 are enclosed by a drive nut member 30 threaded to the body. During tightening and make-up of the fitting, the inner end face, flange, or shoulder 32 of the nut acts against the rear wall of the rear ferrule to drive the ferrules forwardly into the fully engaged position shown in FIG. 1A.

The small diameter portion or nose of the rear ferrule is dimensioned so that it plastically deforms during make-up of the fitting. This action is desirable since it results in tight gripping engagement of the outer wall of the tubing. The thickness of the nose portion cannot be reduced to an extent that the rear ferrule deforms too much and only the rear ferrule adequately grips the outer wall of the tubing. That is, the two ferrule assembly requires desired deformation of both the front and rear ferrules for the gripping and sealing capabilities that have made this two ferrule assembly a commercially successful product. On the other hand, the thickness of the nose of the rear ferrule cannot be enlarged to such an extent that it results in a structural arrangement that is too stiff and does not permit the desired rear ferrule deformation.

Accordingly, it will be recognized by those skilled in the art that a predetermined wall thickness of the nose of the rear ferrule is desired that achieves the desired gripping of the tube and cooperates with the front ferrule in such a manner that it achieves its desired goals of gripping and sealing the tube.

It is also recognized that operators of fluid systems test the system prior to a production run by pressurizing the system to an appropriate factor times the rated system pressure. In this manner, the operator can easily detect whether the fluid system is sealed, i.e. that there are no leaks. With this knowledge, the manufacturer can provide a fitting in which the nose of the rear ferrule will not have any additional plastic deformation at the elevated test pressure. Accordingly, the elevated test pressure is used to determine the desired wall thickness of the nose portion of the rear ferrule to achieve the desired amount of deformation of the nose and permit the front and rear ferrules to properly grip and seal with the outer wall of the tube.

It has also been found that galling of the drive nut sometimes occurs in the drive face area of engagement between the inner end face of the drive nut and the rear wall of the rear ferrule. After analysis, it is believed that the axial thrust or pull-up force between the front and rear ferrule is essentially parallel to the axis of the fitting. This axial thrust causes the rear corner region of the rear ferrule to selectively concentrate pull-up force at the inside drive surface of the nut particularly in a localized area to produce the galling. This also noticeably increases the nut torque forces experienced during make-up even if galling is absent. Accordingly, it would be highly desirable to provide a design wherein the thrust forces do not produce the high localized loading with the resultant galling and high torque forces.

SUMMARY OF THE INVENTION

In accordance with one embodiment of the invention, a tube fitting includes a fitting body having a cylindrical bore for receiving a tube end and including a tapered mouth at one end of the bore; a drive member having a threaded engagement with the body and having a ferrule drive surface; a first ferrule having a tapered first end that extends into the tapered mouth of the fitting body and having a second end with a tapered recess that axially extends toward the first end; and a second ferrule having a cylindrical interior wall, a tapered first end that extends into the tapered recess of the first ferrule, and having a contoured face on a second end thereof that engages the drive member ferrule drive surface; the second ferrule interior wall having a circumferential recess located between the first and second ends of the second ferrule; the recess and the contoured face reducing force concentrations on the drive member drive surface when the fitting is made up.

These and other aspects and advantages of the present invention will be apparent to those skilled in the art from the following description of the preferred embodiments in view of the accompanying drawings.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein:

Figure 14:
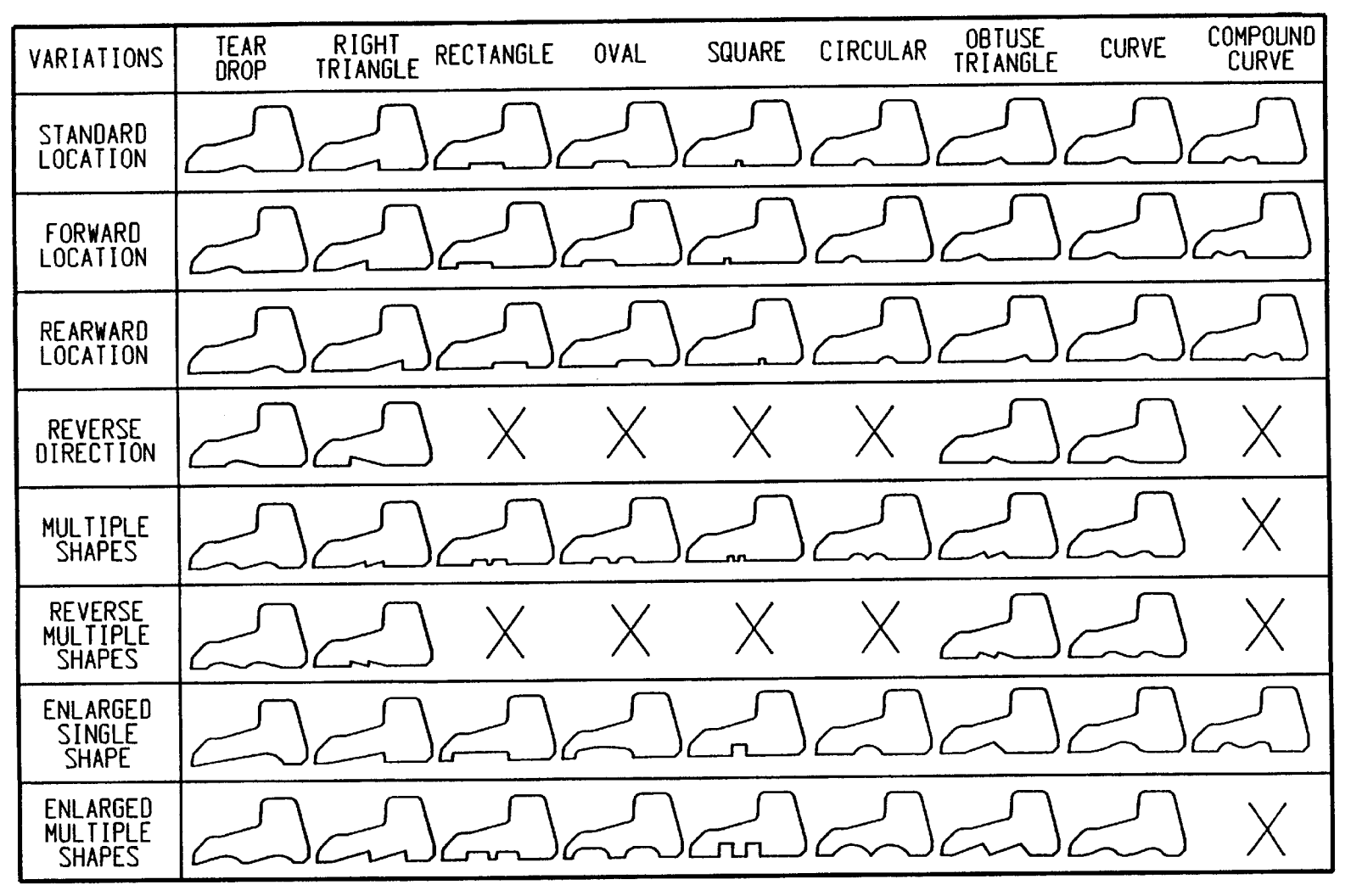

FIG. 14 is a table of different geometrical variations of the rear ferrule configuration;

DETAILED DESCRIPTION OF THE PREFERRED EMBODIMENTS

Figure 1:
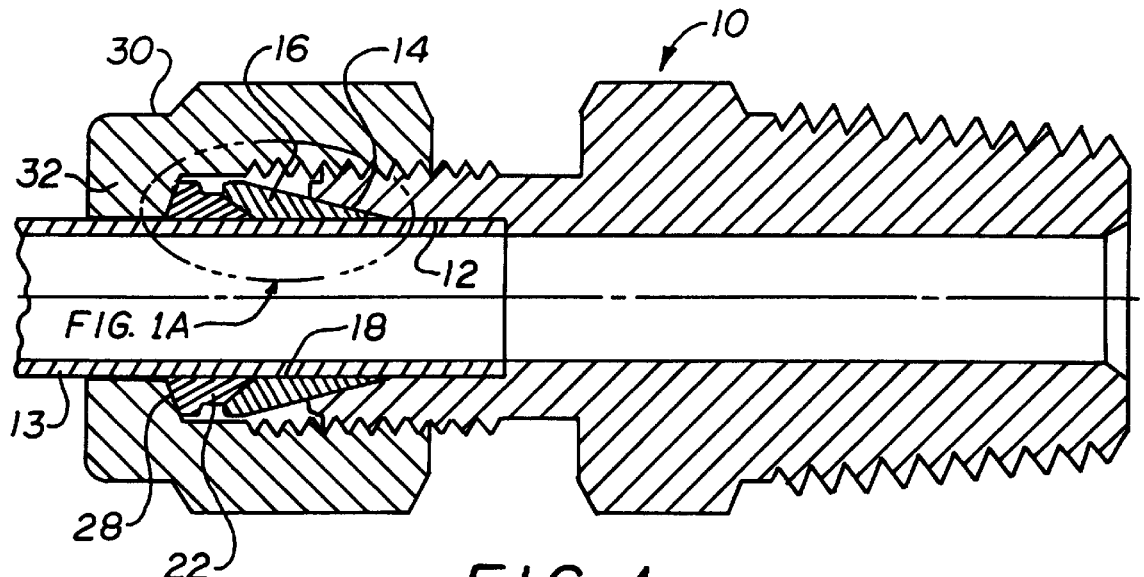
FIG. 1 is a longitudinal cross-sectional view of a well known prior art two ferrule swage-type fitting.
Figure 1A:
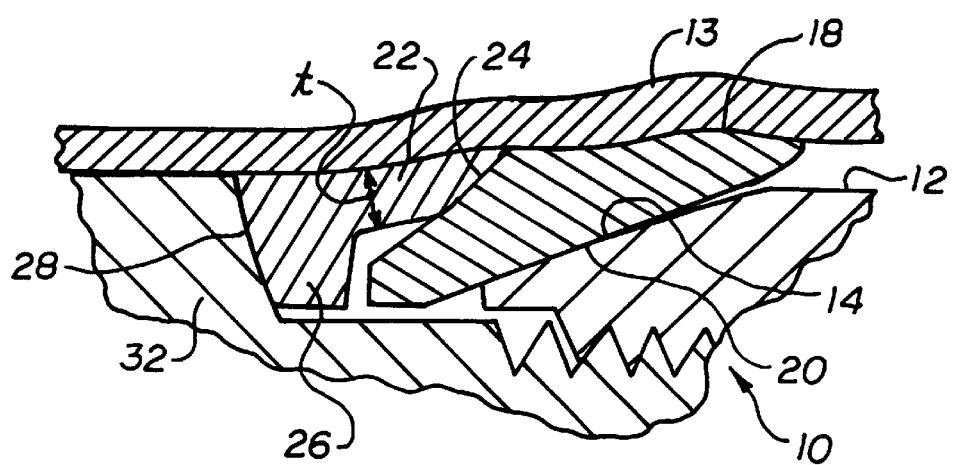
FIG. 1A is an enlarged view of the circled area of FIG. 1 showing the prior art fitting in a made-up condition.
Figure 2:
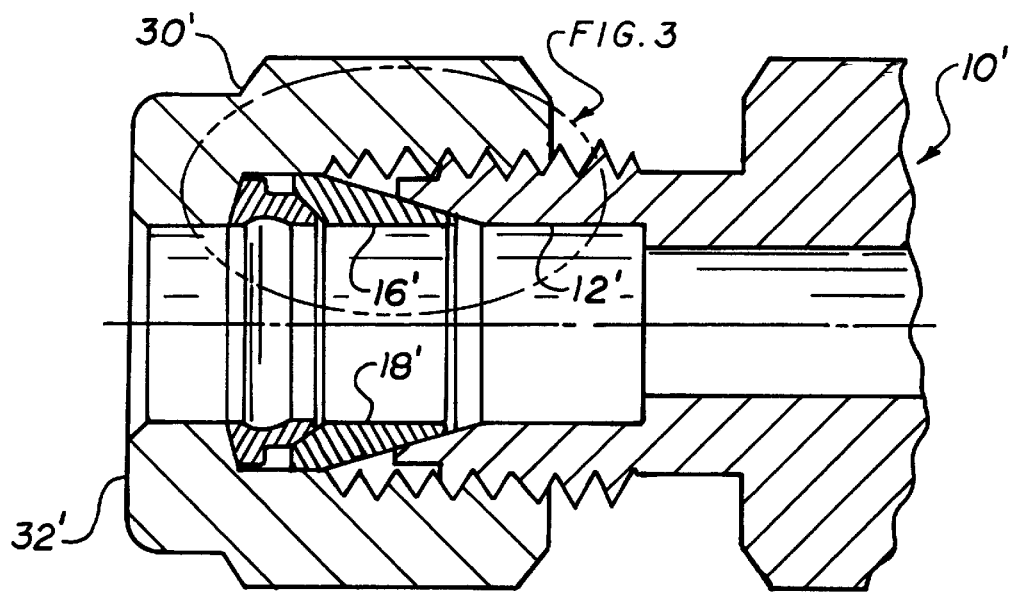
FIG. 2 is a view like FIG. 1 but showing a preferred embodiment of a fitting incorporating a modified rear ferrule designed to improve reaction force transmission through the rear ferrule.
Figure 3:
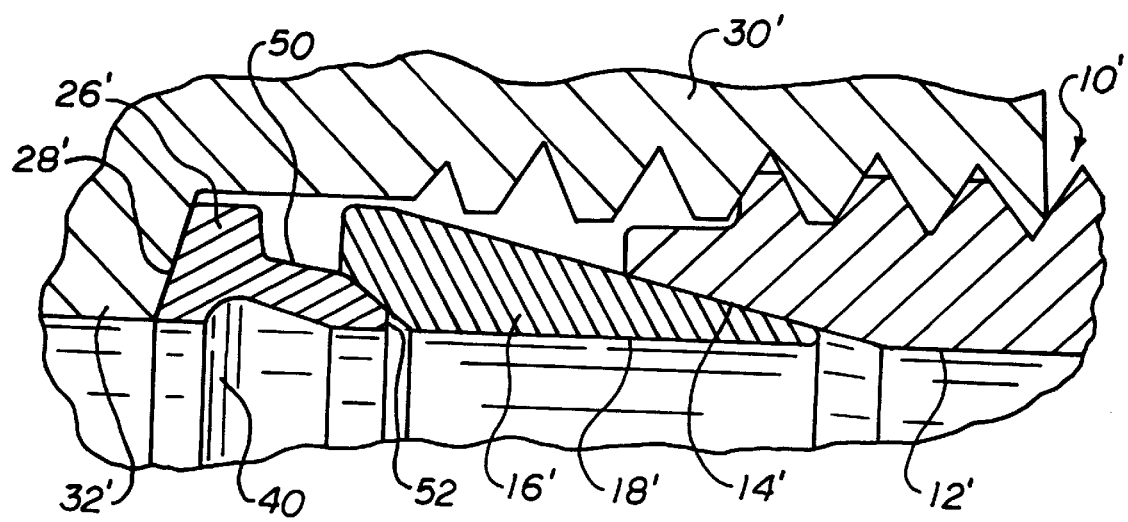
FIG. 3 is a greatly enlarged showing of the circled area of FIG. 2.
Figure 4:
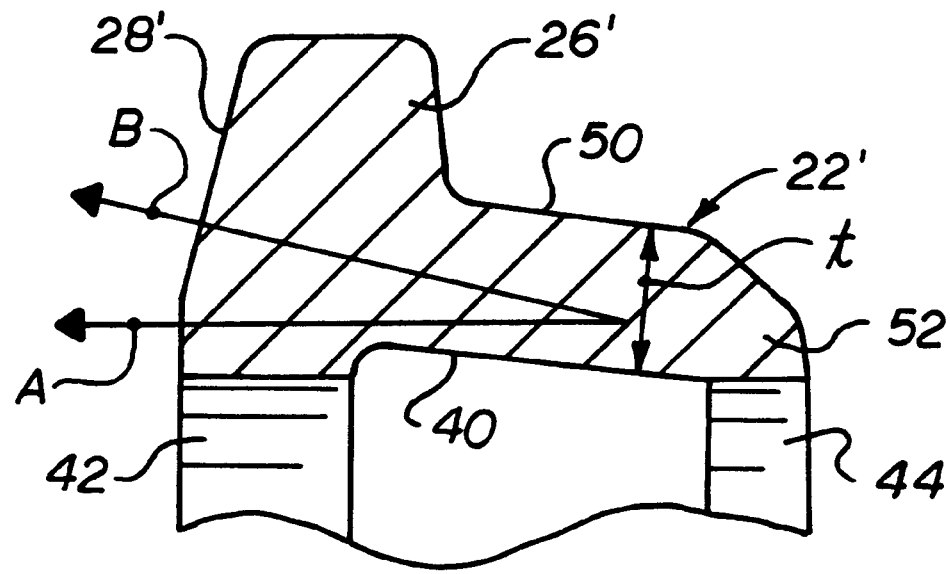
FIG. 4 is a detailed, partial cross-sectional view of a preferred form of rear ferrule.

Referring now to the drawings wherein the showings are for the purposes of illustrating preferred embodiments of the invention only and not for purposes of limiting same, FIGS. 2–4 illustrate the overall arrangement of a fitting incorporating the invention. The FIGS. 2–4 embodiment has the major components identified with the same reference numerals used with respect to the description of the prior art device of FIGS. 1 and 1A. A description of a FIG. 1 element is to be taken as equally applicable to the FIGS. 2–4 elements that are correspondingly numbered unless otherwise noted. In particular, in the FIGS. 2–4 embodiment, the rear ferrule 22' has been modified in a manner to cause the reaction forces acting between the front ferrule through the rear ferrule to the nut to have a significant force component that is directed radially outward. This is in contradistinction to the FIGS. 1 and 1A embodiment wherein the force component under consideration has a high axial component. Specifically, as shown in FIG. 4, force component A extends generally axially of the rear ferrule 22' and results in an increase in the loads applied at the radial inner face of the ferrule surface 28' and the flange 32' of the nut. As previously discussed, high localized loading or force concentration in this area produces high torque and galling.

In the preferred form of the invention, a redirection of the reaction forces is achieved by providing a circumferential recess 40 throughout the inner surface of the ferrule 22'. Note that a recess 40 is located generally midway between the opposite ends of the ferrule 22' and this results in the inner surface of the rear ferrule being reduced to two relatively narrow contact areas 42 and 44. By so modifying the rear ferrule, the forces which are conducted from the front ferrule through the rear ferrule to the nut surface or flange 32' tend to be directed more radially outward such as diagrammatically illustrated by the force line B of FIG. 4.

Another important feature of the invention is best exemplified by comparing the rear ferrule of FIG. 1 with the rear ferrule of the FIGS. 2–4 embodiment. Particularly, the outer radial wall 50 of the rear ferrule includes a conical section that increases in radial dimension as it extends from the forward nose portion, that is received in the rear chamfer region 52 of the front ferrule, to the rear flange 26'. In the prior art arrangement (FIGS. 1 and 1A), the rear ferrule has a cylindrical through bore and an outer radial wall that extends parallel to the inner surface defining the through bore in this region. In other words, the rear ferrule has a constant annular wall thickness "t". In the embodiment of FIGS. 2–4, the outer wall has the conical or tapered configuration that provides sufficient wall thickness "t" and controlled deformation of the nose portion when the recess is incorporated into the modified rear ferrule. Preferably, the outer wall 50 has a generally uniform angle or taper as it extends between the reduced dimension nose region 52 received in the camming mouth of the front ferrule and the enlarged diameter rear flange 26'. Again, this provides controlled deformation of the rear ferrule so that the region 52 is plastically deformed radially inward along surface 44 into gripping, sealed engagement with the outer wall of the tube.

Figure 5:
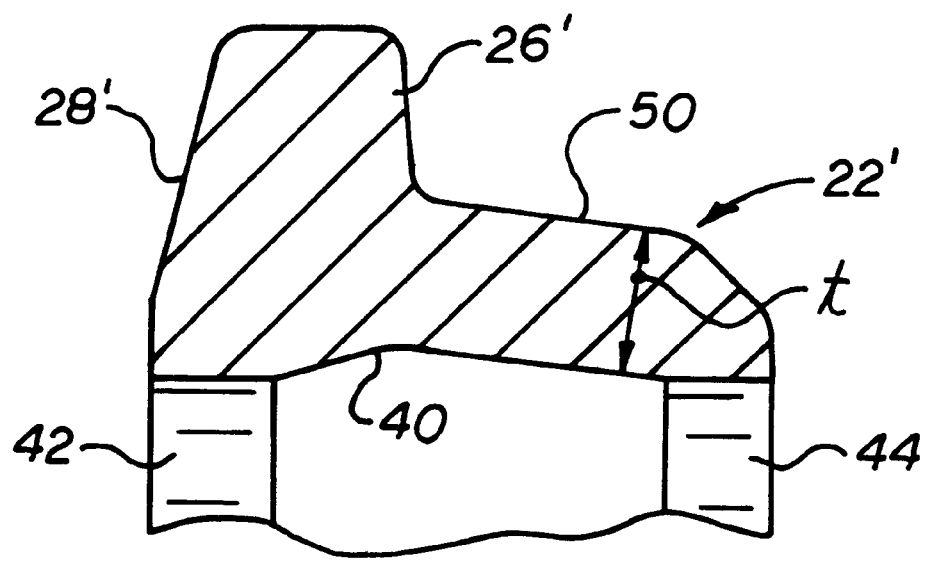
FIG. 5 is a cross-sectional view similar to FIG. 4 showing a second preferred form for the rear ferrule.

FIG. 5 illustrates another preferred embodiment of the rear ferrule in which the recess 40 has is defined by two different angles (an obtuse triangle). For example, the smaller first angle defined with the inner surface increases as it extends rearwardly from the surface 44 toward the rear flange 26'. The larger second angle (approximately twice the angular dimension of the first angle) increases as it extends forwardly from the surface 42 toward the nose region. These angles thus intersect at an axial position that is located beneath the intersection of the outer wall 50 with the rear flange. Accordingly, the forces are more evenly distributed over the rear face 28'.

Figure 6:
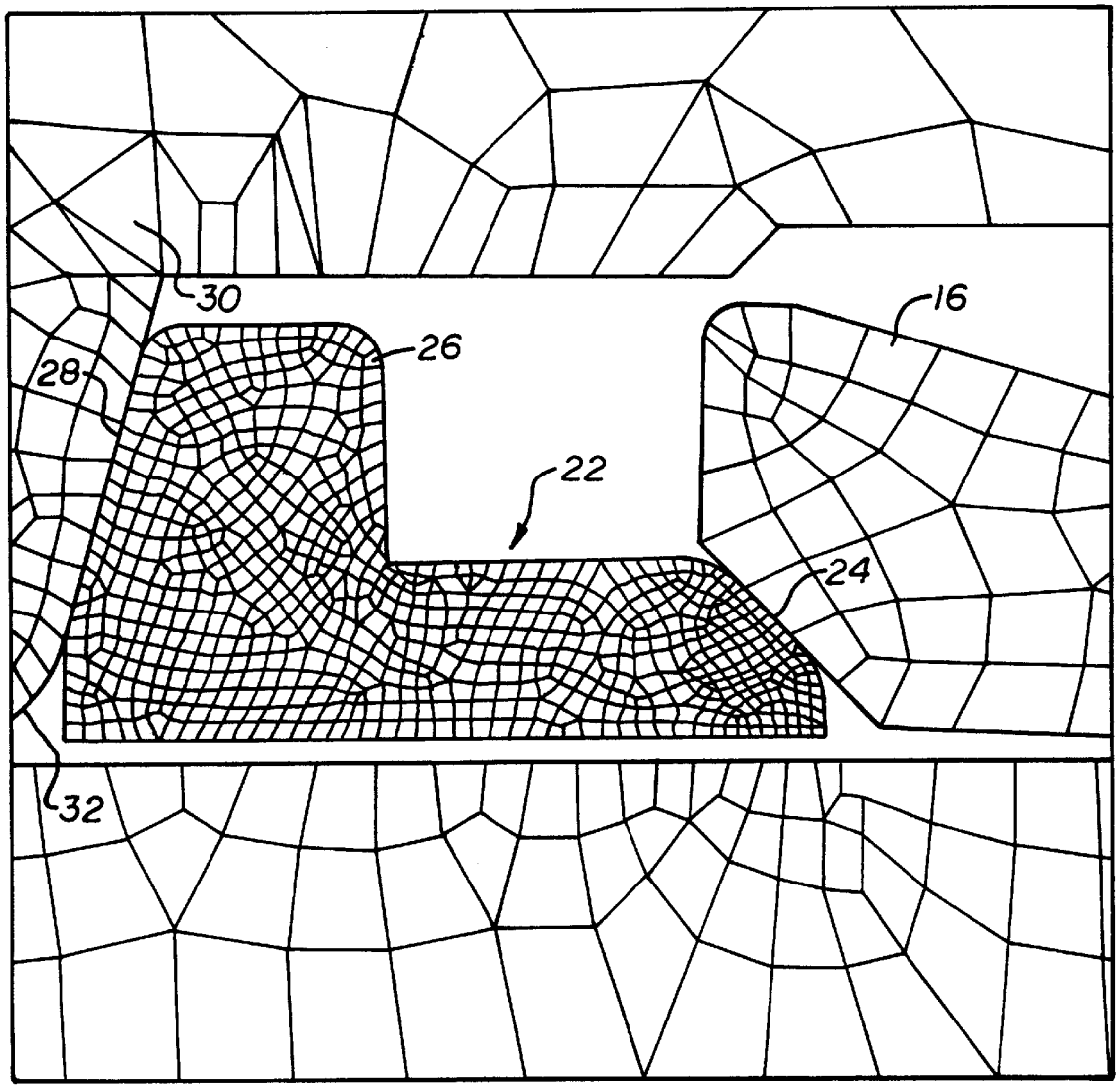
FIG. 6 is a cross-sectional view of the fitting of FIG. 1 particularly showing the rear ferrule positioned between the front ferrule and the nut at initial make-up (graphically meshed for finite element analysis)
Figure 7:
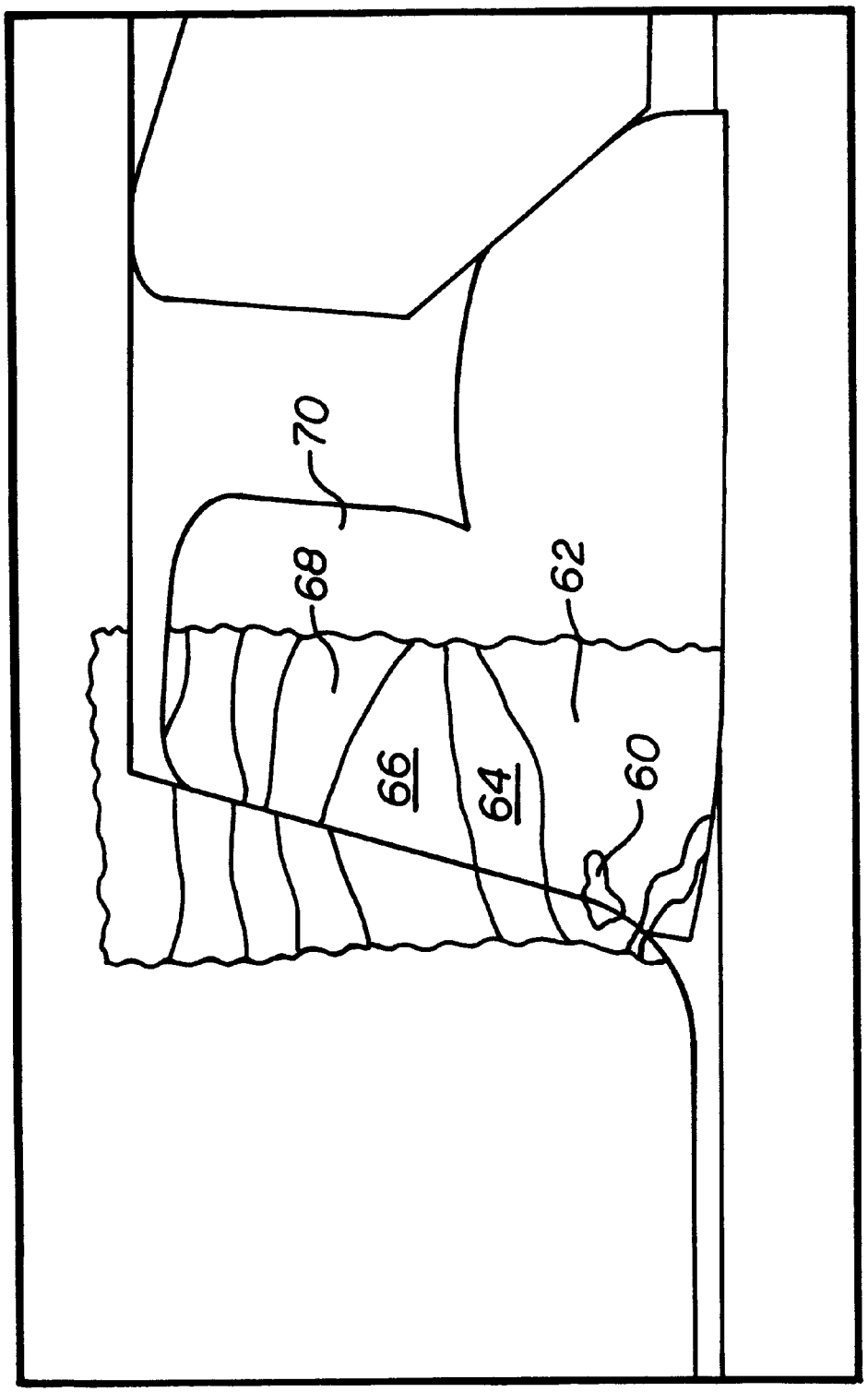
FIG. 7 is a view of the fitting of FIG. 6 in a made-up condition and illustrating the force concentrations.

Turning to FIGS. 6 and 7, the rear ferrule of the prior art arrangement of FIG. 1 is shown before and after make-up of the fitting. The fitting was subjected to a finite element analysis, the results of which are particularly evident in FIG. 7. There, shaded regions in the rear flange of the rear ferrule and the nut evidence the force and stress concentrations encountered upon make-up of the fitting. Particularly, a region of high stress concentration is designated at area 60. Regions of progressively decreased stress concentration are identified by numerals 62, 64, 66, 68, and 70. Thus, the large stress concentration at the radial inner location of the rear face 28' results in increased torque during make-up and potential galling of the nut.

Figure 8:
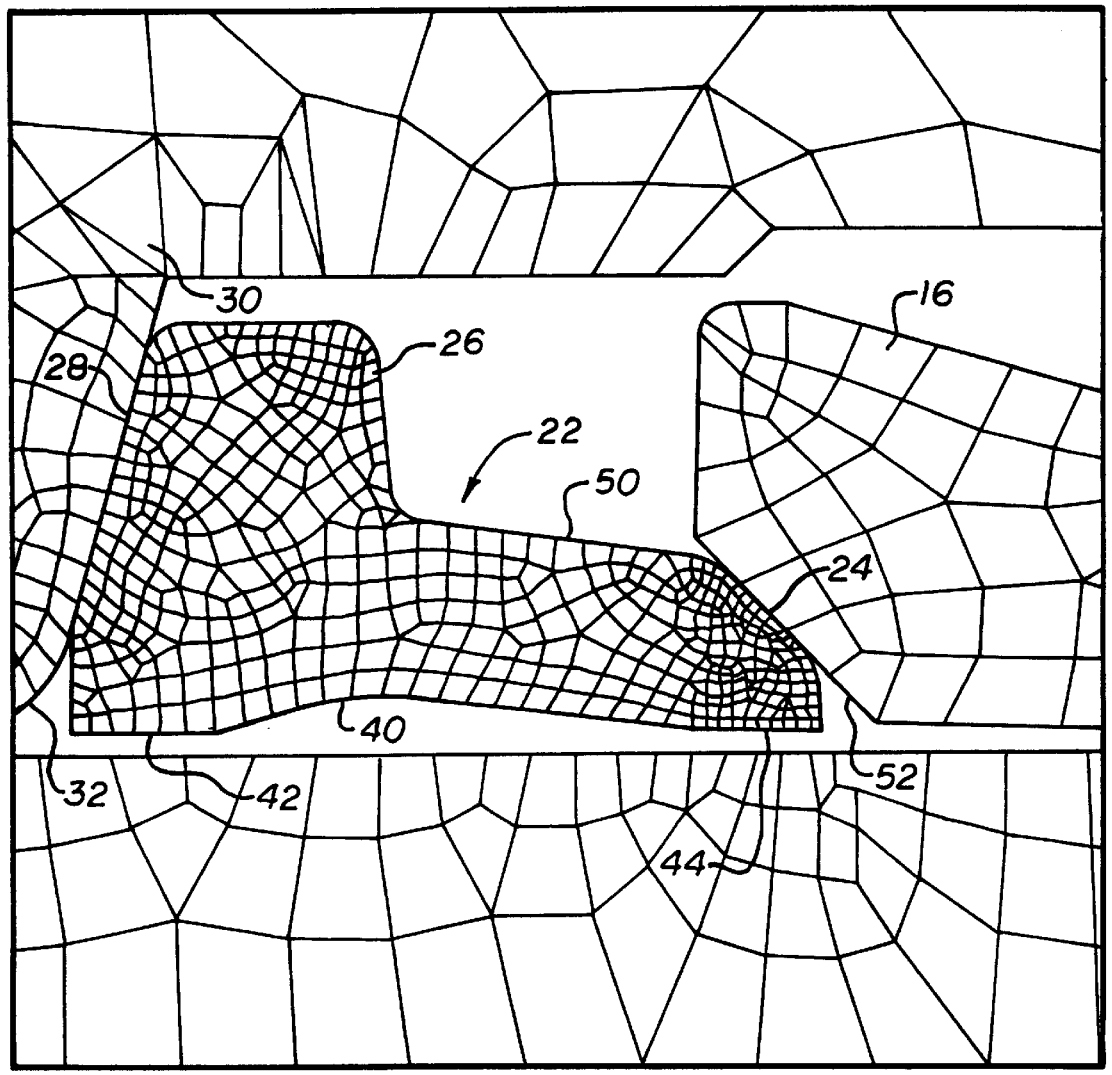
FIG. 8 is a cross-sectional view of a fitting at initial make-up including a rear ferrule modified in accordance with the teachings of the invention (graphically meshed for finite element analysis)
Figure 9:
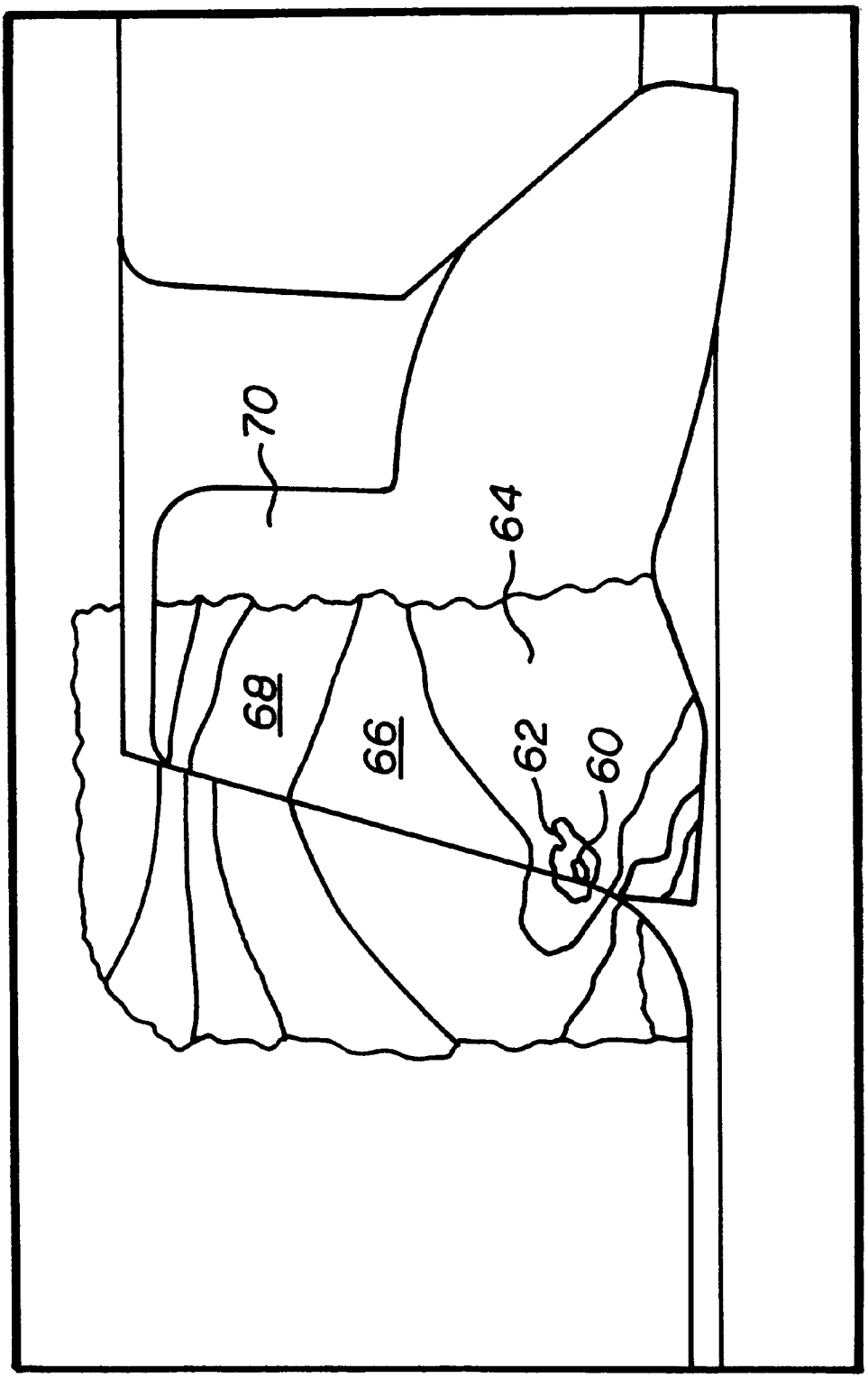
FIG. 9 is a view of the fitting of FIG. 8 in a made-up condition and illustrating the force concentrations.

FIGS. 8 and 9 show another modified rear ferrule in accordance with the teachings of the present invention. This rear ferrule is the same as shown in FIG. 5. As particularly evident in FIG. 9, the region of high stress concentration is substantially reduced in size when compared to FIG. 7. This indicates that the forces have been more uniformly dispersed over the rear face of the flange of the rear ferrule. Thus, the torque is reduced and the potential for galling is likewise reduced.

Figure 10:
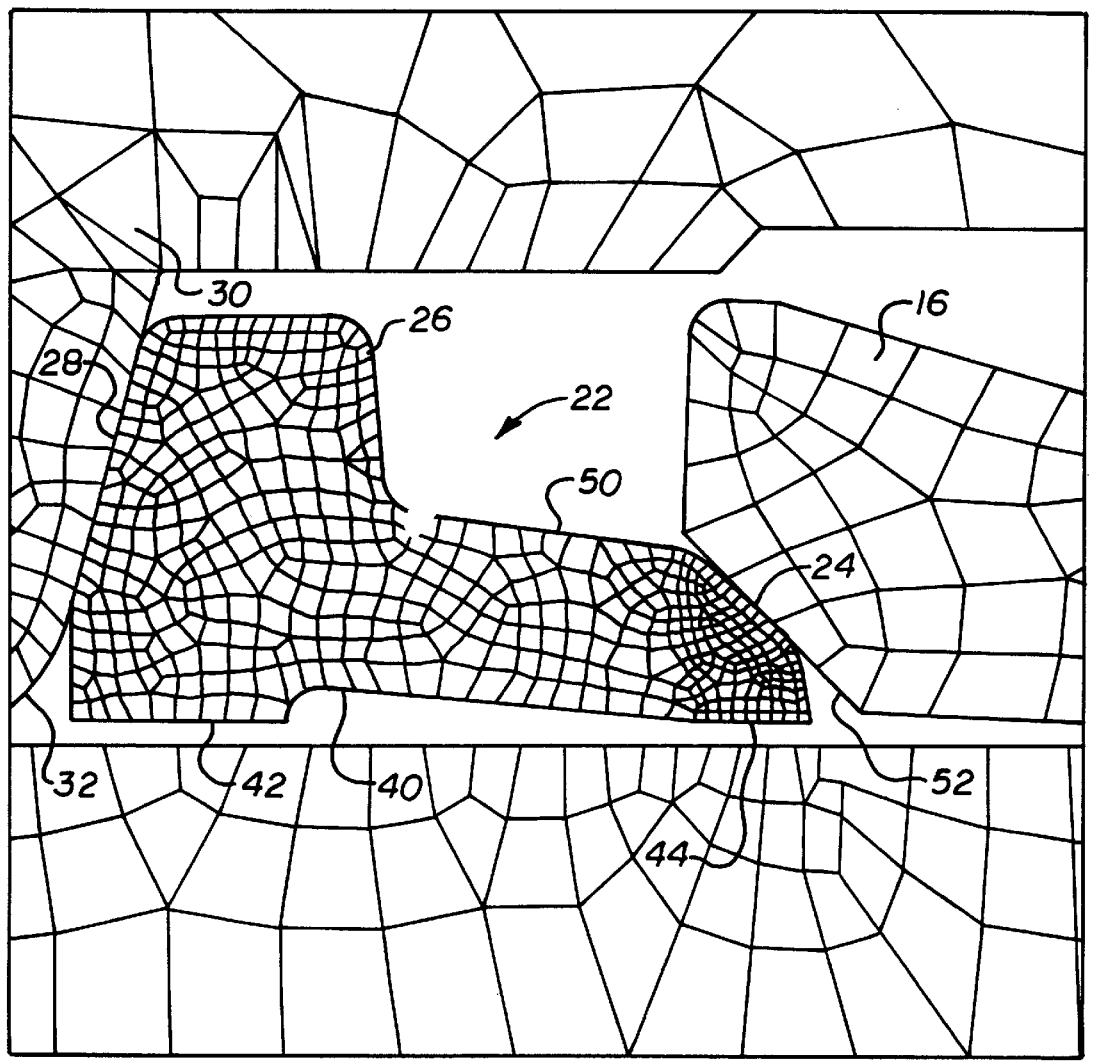
FIG. 10 is a cross-sectional view of a fitting at initial make-up including a rear ferrule modified in accordance with the teachings of the invention (graphically meshed for finite element analysis)
Figure 11:
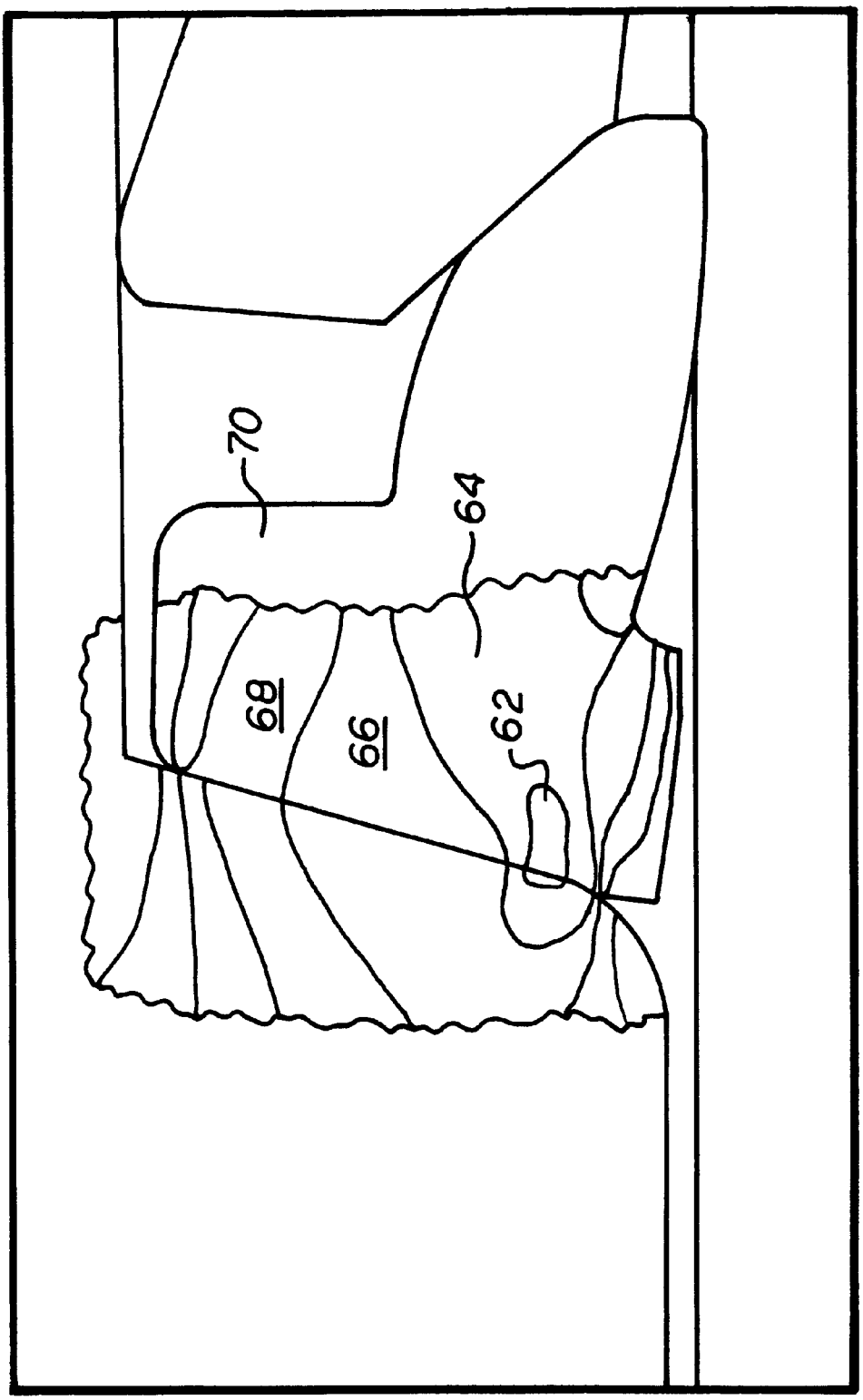
FIG. 11 is a view of the fitting of FIG. 10 in a made-up condition and illustrating the force concentrations.

FIGS. 10 and 11 represent the rear ferrule shown and described in FIG. 4. Here, the finite element analysis illustrates that the region of high stress concentration is substantially removed at the rear face and a more uniform distribution of forces obtained. Again, the torque forces associated with make-up are thus reduced with the corresponding reduction in localized force concentrations. The recess and conical outer wall provide a radial component to the forces generated in the fitting and transferred through the rear ferrule while still providing a desired gripping and sealing of the tube.

Figure 12:
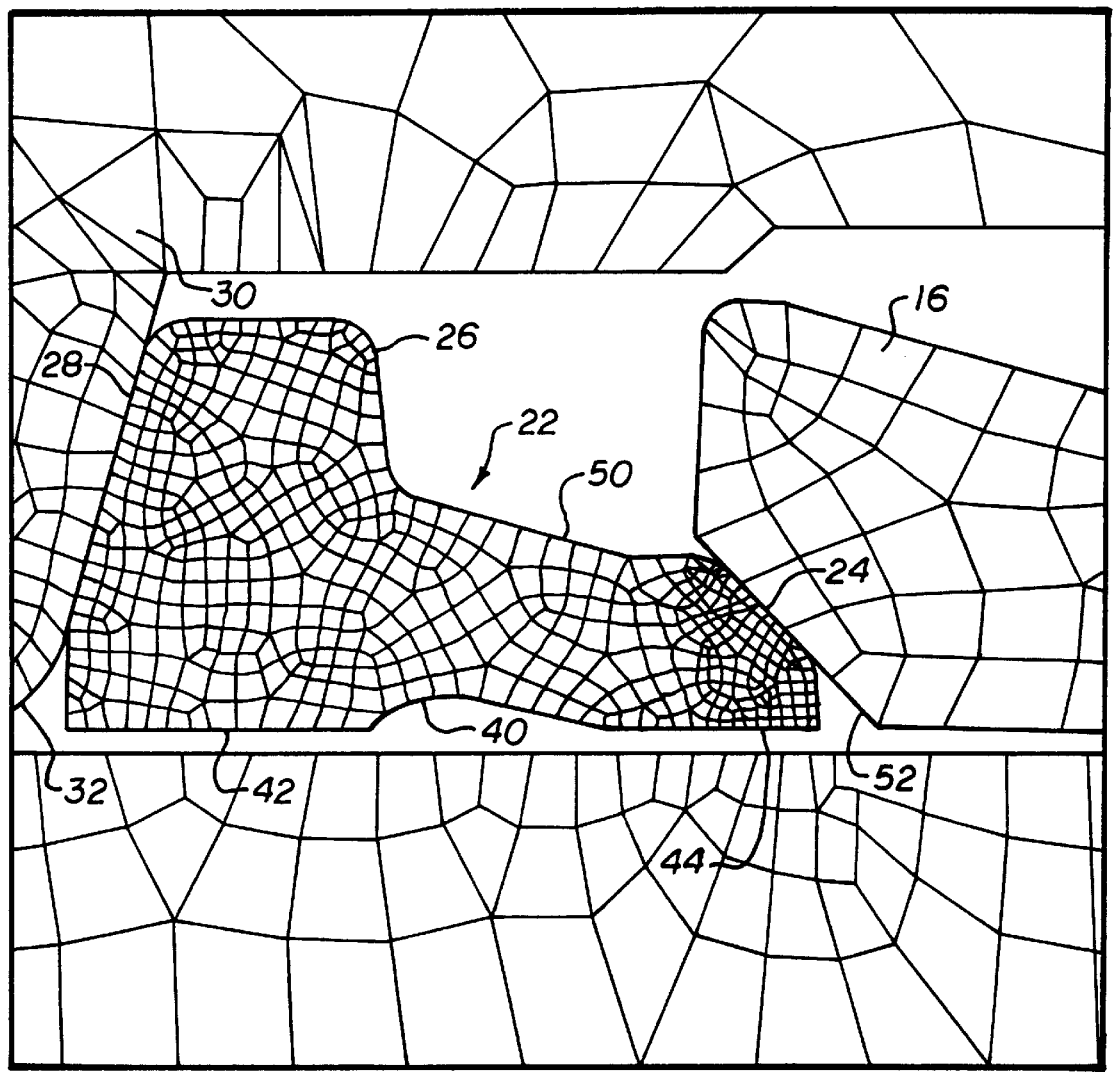
FIG. 12 is a cross-sectional view of a fitting at initial make-up including a rear ferrule modified in accordance with the teachings of the invention (graphically meshed for finite element analysis)
Figure 13:
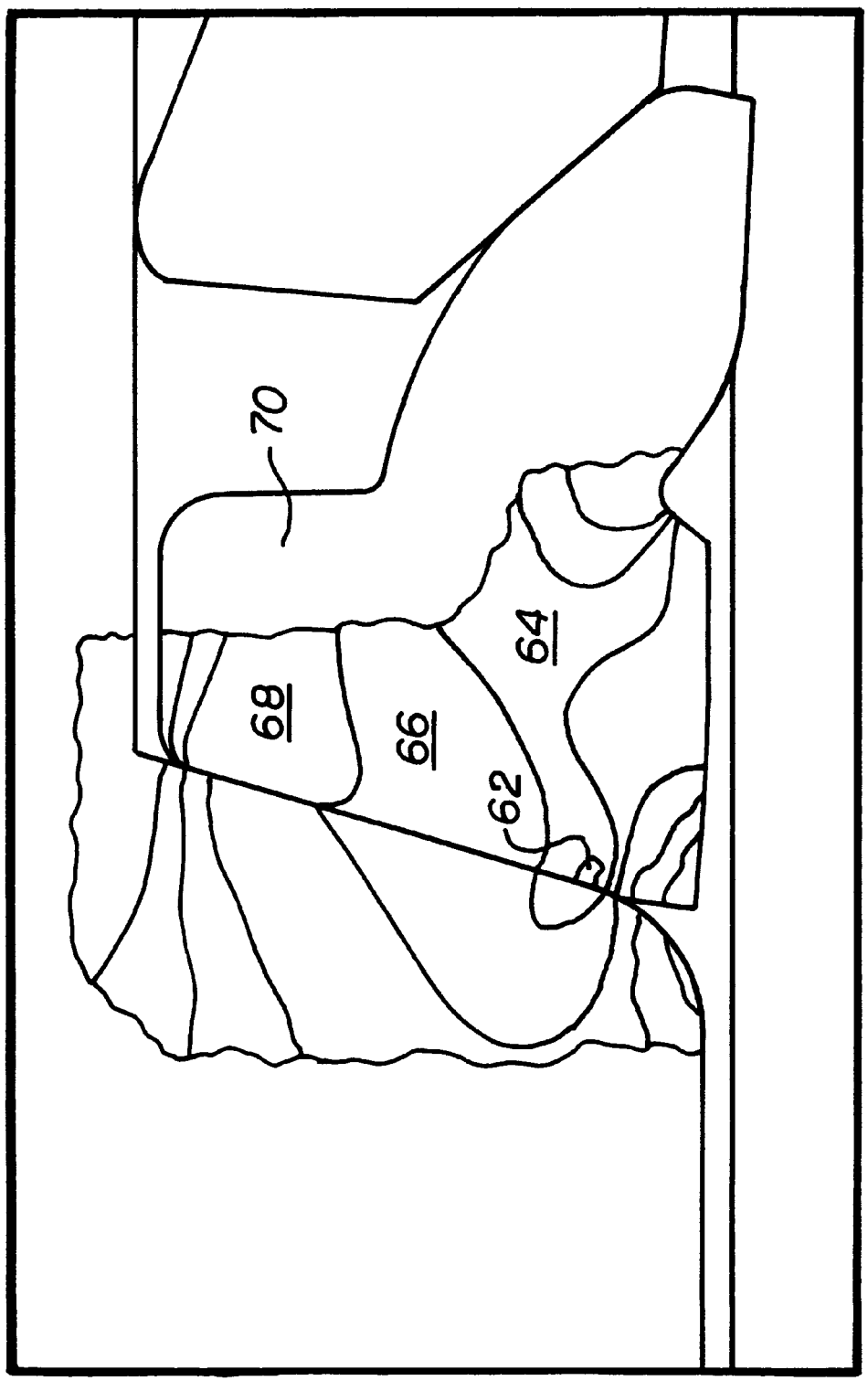
FIG. 13 is a view of the fitting of FIG. 12 in a made-up condition and illustrating the force concentrations.

The embodiment of FIGS. 12 and 13 also achieves these same objectives. The recess is of a slightly different configuration, i.e., the recess is more sharply defined in the inner wall of the rear ferrule. It is also shifted slightly forwardly so that the deepest portion of the recess is located forwardly of the rear flange. However, the outer wall is still of conical configuration and in conjunction with the recess distributes the forces along the rear face of the rear ferrule.

As is apparent with the various embodiments described above, the recess and the tapered outer wall do not require a particular conformation to achieve the force distribution and reduced torque for make-up of the fitting. In fact, a number of proposed alternative embodiments are illustrated in table form in FIG. 14. For example, the first row of geometries have a standard location that is generally defined as the rear edge of the recess being located axially beneath the intersection of the outer wall and the enlarged flange. The tear drop, right triangle, rectangle, oval, square circular, obtuse triangle, curve, and compound curve are various shapes that the recess may adopt. Moreover, the recess can be positioned at a forward location (second row), or a rearward location where the deepest portion of the recess is positioned beneath the enlarged flange (third row) while still adopting the various configurations. Still further, the orientation of the shapes can be reversed as demonstrated by the various geometries in the fourth row or the sixth row, or the recess may be defined by multiple recesses as shown in the geometries of the fifth and eighth rows. Alternatively, the recess(es) may be enlarged as indicated in the seventh and eighth rows. Accordingly, the invention is not limited to the particular configurations shown and described in the earlier embodiments of FIGS. 2–13, but may also be incorporated into selected other geometrical configurations.

With reference to FIGS. 15–20, another embodiment of the invention is illustrated. As noted herein above, the use of a recess 40 in the rear ferrule 22 significantly reduces force concentrations at the drive surface 32 of the drive nut 30 by adding a radial component to the pull up forces. The provision of the tapered outer wall 50 further can contribute to the radial component and force distribution, as well as controlled deformation of the rear ferrule 22 during pull up. In accordance with the embodiments of FIGS. 15–20, the rear ferrule is provided with a contoured drive surface that further reduces force concentrations in the area of engagement between the drive nut 30 and the rear ferrule 22.

Figure 21:
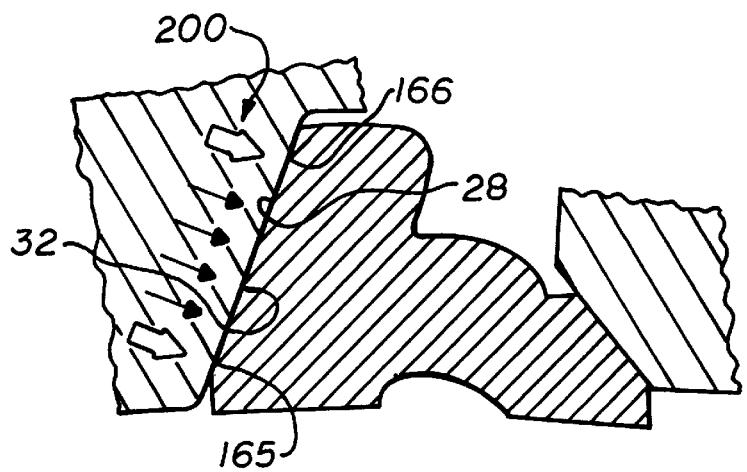
FIG. 21 illustrates force distributions in a two ferrule fitting that does not use a contoured rear ferrule.

FIG. 21 illustrates in an exemplary manner typical pull up force distributions at the dive nut drive surface 32 and the rear ferrule drive surface 28, typical in cases that incorporate a recess 40 type structure in the rear ferrule as described herein before. These force concentrations are represented by the arrows 200. By comparing the force distributions of FIG. 21 and the force concentrations in FIG. 7 (FIG. 7 being illustrative of a rear ferrule that does not include a recess-type structure) it is evident that the provision of the recess configuration significantly and substantially reduces force concentration on the drive nut drive surface 32. This reduction in force concentrations is further evident from a comparison of FIG. 7 with FIGS. 9, 11 and 13. However, as further illustrated in FIG. 21, in some cases there still may be localized force concentrations, particularly on the radial inner and outer portions of the rear ferrule flange 26. These somewhat higher bi-modal force concentrations are represented by the heavier arrows. The present invention is thus directed to further reducing such force concentrations, with the results illustrated in FIG. 19, wherein the force arrows signify a substantial elimination of pull up force concentrations using a modified rear ferrule drive surface and the recessed inner radius.

In accordance with this further aspect of the invention a two ferrule fitting is shown having a rear ferrule which is modified so as to reduce further the pull up force concentrations by substantially distributing the force concentration along the rear surface that engages the drive surface 32 of the drive nut 30. As is shown in FIGS. 15–18, corresponding fitting components are shown in finger-tight position preparatory to final tightening.

Figure 15:
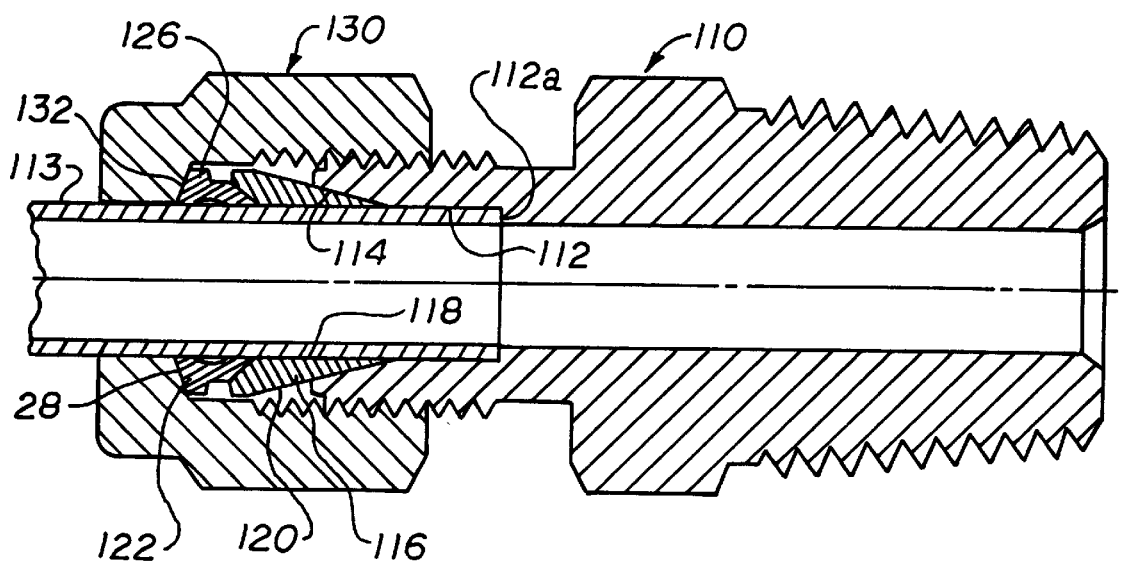
FIG. 15 is a cross-sectional view of an alternative embodiment of a two ferrule fitting.
Figure 16:
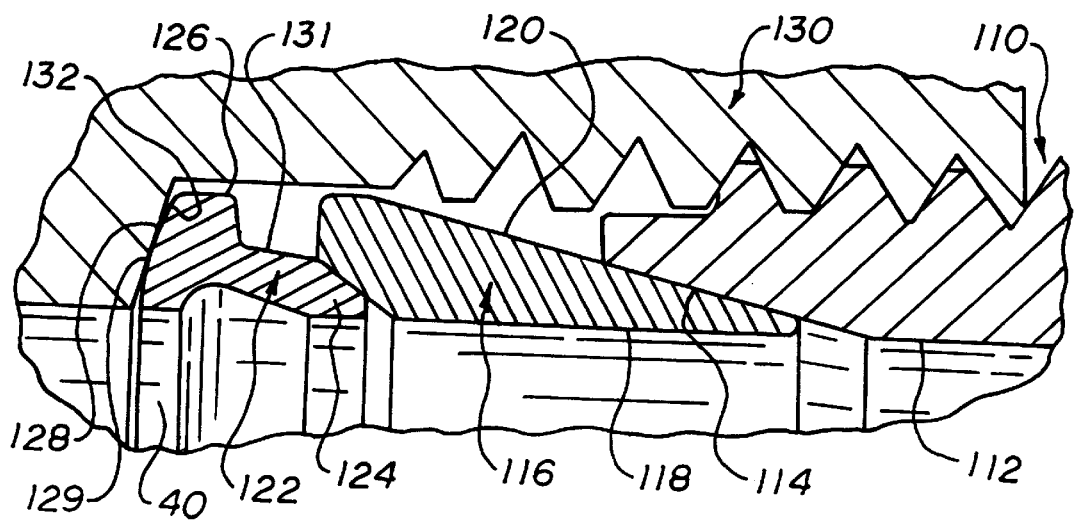
FIG. 16 is an enlarged view of the ferrule region of the embodiment of FIG. 15.
Figure 17:
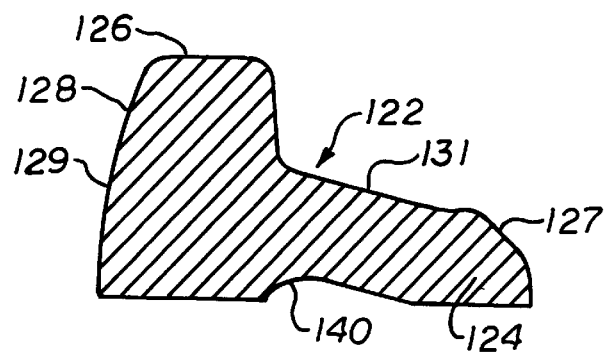
FIG. 17 is a partial view of a rear ferrule with a contoured face in accordance with one aspect of the invention.

With specific reference to FIGS. 15 and 16, the fitting comprises a body 110 having a cylindrical opening 112 for receiving a tube end 113 that bottoms on a counterbore 112a. A tapered, frusto-conical cam mouth 114 is located at the axial rear or receiving end of the opening 112. A front ferrule 116 having a smooth, cylindrical, radially inner wall 118 is closely received on the tube 113. The front ferrule 116 has a tapered outer surface 120 which engages the tapered mouth 114 of the body 110.

Associated with the front ferrule 116 and located axially adjacent (i.e., in a rearward direction concentrically aligned with the longitudinal axis of the fitting) is a rear ferrule 122 configured with a tapered nose portion 124 having a rearward, tapered surface 127. The rear ferrule 122 also includes a radially extending rear flange 126 having a contoured end face 128. The contoured face 128 includes a rearward-facing driven surface 129 which is engaged by a respective driving surface 132 of the drive nut 130.

The tapered nose surface 127 of the rear ferrule 122 engages and may have, but not necessarily, substantially the same angle as a tapered cam surface 125 in the rear area of the front ferrule 116. The nose portion 124 is joined with the flange 126 by a preferably tapered outer wall 131. In the illustrated embodiment the wall 131 tapers with an increasing radial dimension in the axially rearward direction. The outer wall 131 could also be cylindrical, although it is preferred to be tapered to further facilitate reduction of force concentrations on the rear surface 129.

The ferrules 116 and 122 are enclosed by a threaded drive nut member 130 which includes a drive surface 132 that engages the contoured face 129 of the rear ferrule 122. The nut member 130 threadably engages a threaded portion of the body 110. During tightening and make-up of the fitting, the drive surface 132 of the nut 130 applies pull up forces against the contoured face 129 of the rear ferrule 122 to drive both ferrules axially forward (to the right as viewed in FIG. 16) into the fully engaged position shown in FIG. 19. The rear ferrule is configured so that upon forced engagement with the tapered cam surface 125, the nose portion 124 deforms radially inward. This action is desirable since it results in a tight gripping engagement of the rear ferrule 122 inner cylindrical wall with the outer surface of the wall of the tubing 113.

Figure 18:
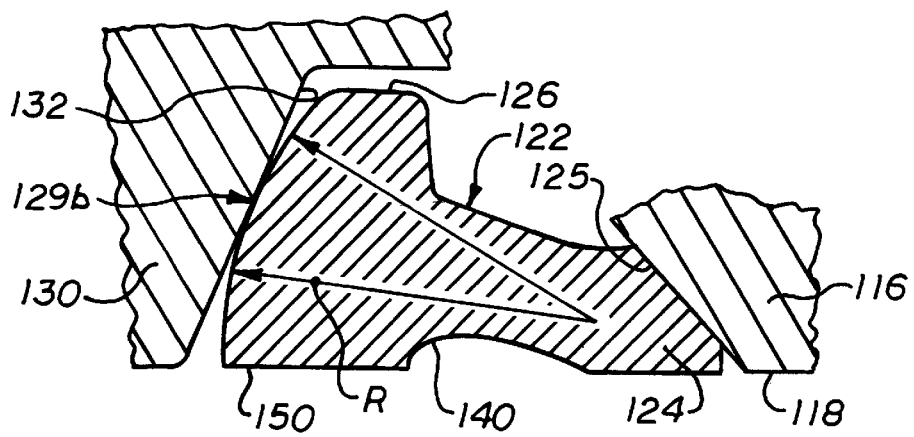
FIG. 18 is a partial view of a contoured rear ferrule shown in the engaged position with a front ferrule and drive nut surfaces prior to pull up.
Figure 19:
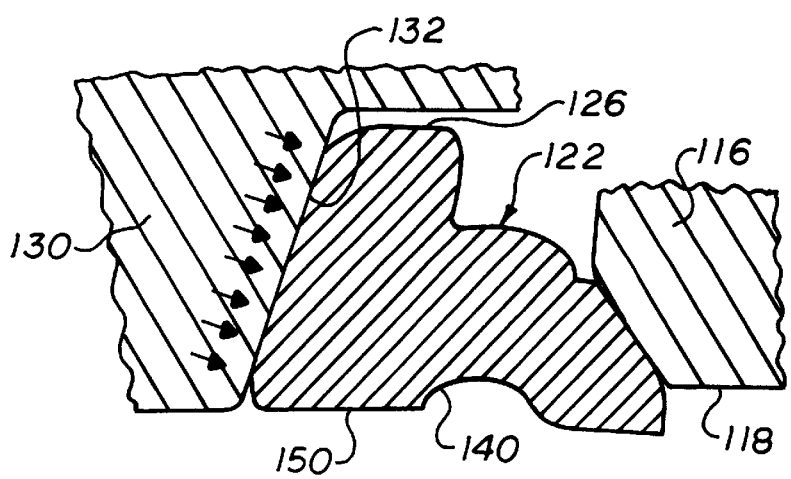
FIG. 19 is a view of the embodiment of FIG. 18 in the pulled up condition showing force distributions.
Figure 20:
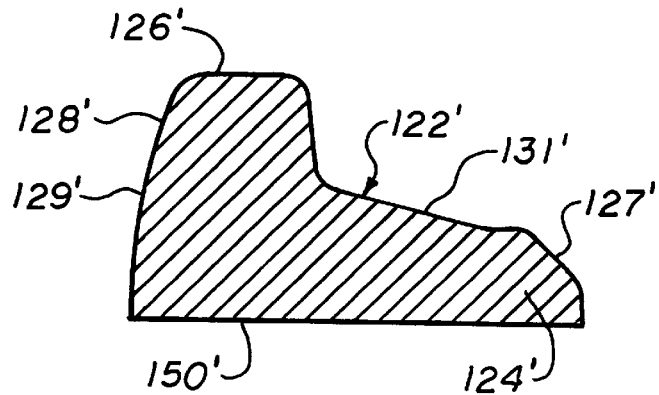
FIG. 20 is another embodiment of the invention.

In the embodiments illustrated in FIGS. 15–20, the contoured face 128 of the rear ferrule 122 is rounded, curved, arcuate, or bowed, and preferably has a portion of which is a contour in the form of a convex radius R. The center of the radius can be, for example, internal to the ferrule body as shown in FIG. 18. However, those skilled in the art will readily appreciate that the origin of the radius surface 129 can be located anywhere with respect to the rear ferrule structure with the illustration of FIG. 18 being provided for illustrative purposes only. One aspect of the contoured face 128 is that with the driven surface 129 in the form of a convex radius, a line contact 129$b$ (or reduced face to face radial contact) is formed initially with the nut drive surface 132, in a region between the inner and outer radial portions of the flange 126. The rear ferrule also preferably includes a recess 140 which can be of any configuration as previously described herein above. Alternatively, the contoured rear face 128 can be used with a rear ferrule configuration that omits the recess 140, as illustrated in FIG. 20.

A distinct advantage of the contoured rear ferrule 122 is that pull up forces between the nut drive surface 132 and the contoured face 128 of the rear ferrule 122 are more uniformly distributed across the surface 128 of the rear ferrule, thus reducing and substantially eliminating force concentrations. This further reduction of force concentrations on the drive nut 130 reduces pull up torque and reduces galling, thus facilitating re-make of the fitting.

It is important to note that although the illustrated embodiments show an initial contact between the rear ferrule 122 and the drive nut 130 as generally in the middle of the contoured face 128, this is not required in every application. The initial point of contact will be a function of the overall fitting design, including the geometry of the tapered wall 131, the recess 140, the nose portion 127, the front ferrule 116 configuration and so forth. But in keeping with a general aspect of the invention, the contoured face 128 will be convex or axially variant in the region between the radial inner and outer portions of the flange 126 so as to distribute more uniformly the pull up forces acting on the drive nut 132 to reduce galling and pull up torque as compared to a conventional rear ferrule design that has a substantially flat non-contoured driven surface 128.

FIG. 20 illustrates an embodiment of the invention in which the rear ferrule 122' has a substantially cylindrical inner wall 150', but otherwise includes the flange 126' having a contoured driven surface 128' and a nose portion 124' with a front bevel 127 and a tapered outer wall 131'.

Figure 22:
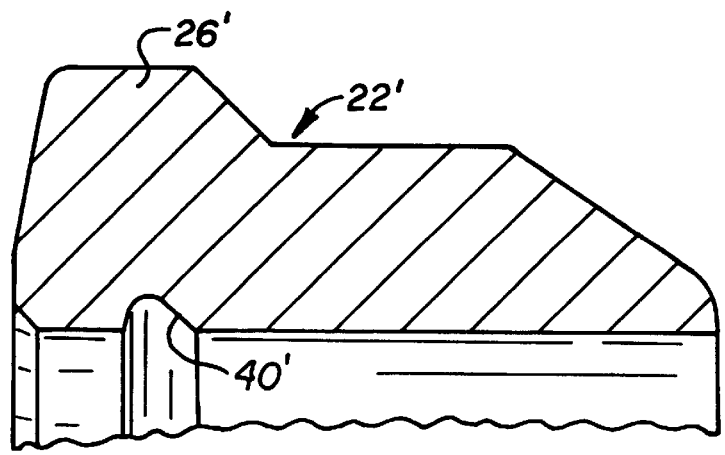
FIG. 22 illustrates another embodiment of a rear ferrule design incorporating a circumferential recess.

FIG. 22 illustrates another embodiment of the invention wherein the rear ferrule 22' design for larger tubes such as ½" for example, can have the recess 40' shifted axially rearward, generally within the axial dimension of the flange 26'.

The invention has been described with reference to the preferred embodiment. Obviously, modifications and alterations will occur to others upon a is reading and understanding of this specification. It is intended to include all such modifications and alterations insofar as they come within the scope of the appended claims or the equivalents thereof.

Having thus described the invention, it is claimed:

1. A tube fitting comprising: a fitting body having a cylindrical bore for receiving a tube end and including a tapered mouth at one end of said bore; a drive member having a threaded engagement with said body and having a ferrule drive surface; a first ferrule having a tapered first end that extends into said tapered mouth of the fitting body and having a second end with a tapered recess that axially extends toward said first end; and a second ferrule having a substantially continuous cylindrical interior wall that closely surrounds the tube end, a tapered first end that extends into said tapered recess of said first ferrule, and having a contoured face on a second end thereof that engages said drive member ferrule drive member ferrule drive surface; said second ferrule substantially continuois cylindrical interior wall having a circumferentially recess located between said first and second ends of said second ferrule and axially spaced from said second ferrule first end; said recess and sid contoured face reducing force concentrations on said drive member drive surface when the fitting is pulled up.

2. The fitting of claim 1 wherein said drive member axially drives said second ferrule into said first ferrule tapered recess and axially drives said first ferrule into said body tapered mouth when said drive member is pulled up with said body.

3. The fitting of claim 1 wherein said second ferrule circumferential recess has an increasing radial depth in the axial direction toward said second ferrule second end.

4. The fitting of claim 1 wherein said second ferrule comprises a radially extending flange that defines said contoured face and defines a forward face that is spaced from said second ferrule first end; said second ferrule having a tapering outer wall between its first and second ends for adding a radial component to pull up forces occurring at said drive member drive surface.

5. The fitting of claim 1 wherein said convex surface having a maximum axial extent between radial inner and outer ends of said second ferrule second end.

6. The fitting of claim 5 wherein said convex surface forms a line contact with said drive surface upon initial engagement therewith during pull up of the fitting.

7. The fitting of claim 1 wherein said contoured face and said circumferential recess produce a radial component in pull up forces occurring at said drive surface to substantially reduce concentrated axial forces at said drive surface.

8. The fitting of claim 1 wherein said contoured face and said circumferential recess produce a radial component in pull up forces occurring at said drive surface to distribute more uniformly said pull up forces across an interface area between said drive surface and said contoured face as compared to force concentration areas present in absence of said contoured face and said circumferential recess.

9. The fitting of claim 1 comprising a plurality of circumferential recesses.

10. A tube fitting comprising: a fitting body having a cylindrical bore for receiving a tube end and including a tapered mouth at one end of said bore; a drive member having a threaded engagement with said body and having a ferrule drive surface; a first ferrule having a tapered first end that extends into said tapered mouth of the fitting body and having a second end with a tapered recess that axially extends toward said first end; and a second ferrule having a substantially continuous cylindrical interior wall that closely surrounds the tube end, a tapered first end that extends into said tapered recess of said first ferrule, and having a contoured face on a second end thereof that engages said drive member ferrule drive surface; wherein said contoured face is a convex surface;

said second ferrule substantially continuous cylindrical interior wall having a circumferentially continuous recess located between said first and second ends of said second ferrule and axially spaced from said second ferrule first end; said recess and said contoured face reducing force concentrations on said drive member drive surface when the fitting is pulled up.

11. A ferrule for a tube fitting, comprising: a generally annular body having a longitudinal axis; a tapered nose portion at a first end of the ferrule; a flange at a second end of the ferrule axially opposite said first end; a substantially continuous cylindrical interior wall extending through the ferrule and adapted to slide over and closely surround a longitudinal tube; a circumferentially continuous recess in said substantially continuous cylindrical interior wall and located between said first and second ends and axially spaced from said nose portion; said flange having an outer radially extending surface that is contoured; said contoured surface being convex and having a maximum axial extent between radially inner and outer ends of said flange second end.

* * * * *

UNITED STATES PATENT AND TRADEMARK OFFICE
CERTIFICATE OF CORRECTION

PATENT NO. : 6,131,963
DATED : October 17, 2000
INVENTOR(S) : Peter C. Williams et al.

It is certified that error appears in the above-identified patent and that said Letters Patent is hereby corrected as shown below:

Column 7,
Line 64, please delete "is".

Column 8,
Line 13, please delete "drive member ferrule".
Line 14, please delete "continuois" and insert -- continuous --.
Line 15, please delete "circumferentially recess" and insert -- circumferentially continuous recess --.
Line 17, please delete "sid" and insert -- said --.
Line 19, please delete "pulled" and insert -- made --.

Signed and Sealed this

Twenty-fifth Day of May, 2004

JON W. DUDAS
*Acting Director of the United States Patent and Trademark Office*